United States Patent
Mattsson et al.

(10) Patent No.: US 9,514,169 B2
(45) Date of Patent: Dec. 6, 2016

(54) COLUMNAR TABLE DATA PROTECTION

(71) Applicant: Protegrity Corporation, George Town, Grand Cayman (KY)

(72) Inventors: Ulf Mattsson, Cos Cob, CT (US); Yigal Rozenberg, Wilton, CT (US); Raul Ortega, Westport, CT (US)

(73) Assignee: Protegrity Corporation, Grand Cayman (KY)

( * ) Notice: Subject to any disclaimer, the term of this patent is extended or adjusted under 35 U.S.C. 154(b) by 253 days.

(21) Appl. No.: 14/479,816

(22) Filed: Sep. 8, 2014

(65) Prior Publication Data
US 2015/0089574 A1 Mar. 26, 2015

Related U.S. Application Data

(60) Provisional application No. 61/881,237, filed on Sep. 23, 2013.

(51) Int. Cl.
G06F 21/62 (2013.01)
G06F 17/30 (2006.01)
G06F 21/60 (2013.01)

(52) U.S. Cl.
CPC ....... *G06F 17/30315* (2013.01); *G06F 21/602* (2013.01); *G06F 21/6227* (2013.01); *G06F 21/6245* (2013.01); *G06F 21/6254* (2013.01)

(58) Field of Classification Search
CPC .......................... G06F 21/6227; G06F 21/602
See application file for complete search history.

(56) References Cited

U.S. PATENT DOCUMENTS

| | | | |
|---|---|---|---|
| 6,112,209 A * | 8/2000 | Gusack | G06F 17/30321 |
| 7,058,642 B2 * | 6/2006 | Kurupati | G06F 17/30595 |
| 7,120,933 B2 | 10/2006 | Mattsson | |
| 7,305,707 B2 | 12/2007 | Mattsson | |
| 7,974,942 B2 * | 7/2011 | Pomroy | G06F 17/30286 707/610 |
| 2002/0003881 A1 * | 1/2002 | Reitmeier | H04L 9/34 380/210 |
| 2006/0034459 A1 * | 2/2006 | Uchikawa | G06F 21/6209 380/255 |
| 2006/0041533 A1 * | 2/2006 | Koyfman | G06F 17/30312 |
| 2008/0082834 A1 | 4/2008 | Mattsson | |
| 2008/0133935 A1 * | 6/2008 | Elovici | G06F 21/6227 713/193 |
| 2009/0249082 A1 | 10/2009 | Mattsson | |
| 2010/0131518 A1 * | 5/2010 | Elteto | G06F 21/105 707/752 |
| 2011/0213807 A1 | 9/2011 | Mattsson | |
| 2013/0275718 A1 * | 10/2013 | Ueda | G06F 9/30032 712/204 |
| 2015/0095252 A1 | 4/2015 | Mattsson et al. | |

OTHER PUBLICATIONS

McCallister, E. et al., "Guide to Protecting the Confidentiality of Personally Identifiable Information (PII)," Apr. 2010, , May be retrieved at<URL:http://csrc.nist.gov/publications/PubsSPs.html>.

* cited by examiner

*Primary Examiner* — Jung Kim
*Assistant Examiner* — Ngoc D Nguyen
(74) *Attorney, Agent, or Firm* — Fenwick & West LLP

(57) ABSTRACT

Shuffling data stored in columnar tables improves data storage security, particularly when used in conjunction with other security operations, such as tokenization and cryptography. A data table is accessed, and pointer values of at least one column of the accessed table are shuffled, generating a protected table. An index table mapping index values to the shuffled pointer values is generated, allowing a user with access to both the protected table and the index table to generate the original table. Without both tables, users are only able to see either the shuffled data or the index values. Example shuffling methods include, but are not limited to, random shuffling, grouped shuffling, sorting by column value, and sorting by index value.

17 Claims, 7 Drawing Sheets

COLUMNAR TABLE DATA PROTECTION

CROSS REFERENCE TO RELATED APPLICATIONS

This application claims the benefit of and priority to U.S. Provisional Application No. 61/881,237 filed Sep. 23, 2013, which is incorporated by reference herein in its entirety.

FIELD OF ART

This disclosure relates to security in digital storage environments, and in particular, to shuffling data tables to protect data stored in columnar tables.

BACKGROUND

Large-scale data storage at data centers and warehouses poses myriad data security concerns, particularly if the stored data is sensitive. Data is often stored in data tables, and one or more security mechanisms can be implemented to protect such data. For instance, the data can be protected using encryption, tokenization, and other data transformation techniques. Such techniques protect the data, but can be overcome by an unauthorized entity that gains possession of an encryption key, a token table, and the like. Accordingly, additional data protection techniques, particularly those that take advantage of the structure of the data within data tables, can improve the security of stored data.

SUMMARY

Data stored in columnar tables is shuffled, creating a protected data table and an index data table. Shuffling data within a data column can improve data storage security, particularly when used in conjunction with other security operations, such as tokenization and cryptography. A data table is accessed, and pointer values of at least one column of the accessed table are shuffled, generating a protected table. An index table mapping index values to the shuffled pointer values is generated, allowing a user with access to both the protected table and the index table to generate the original table. Without both tables, users are only able to see either the shuffled data or the index values. Example shuffling methods include, but are not limited to, random shuffling, grouped shuffling, sorting by column value, and sorting by index value.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
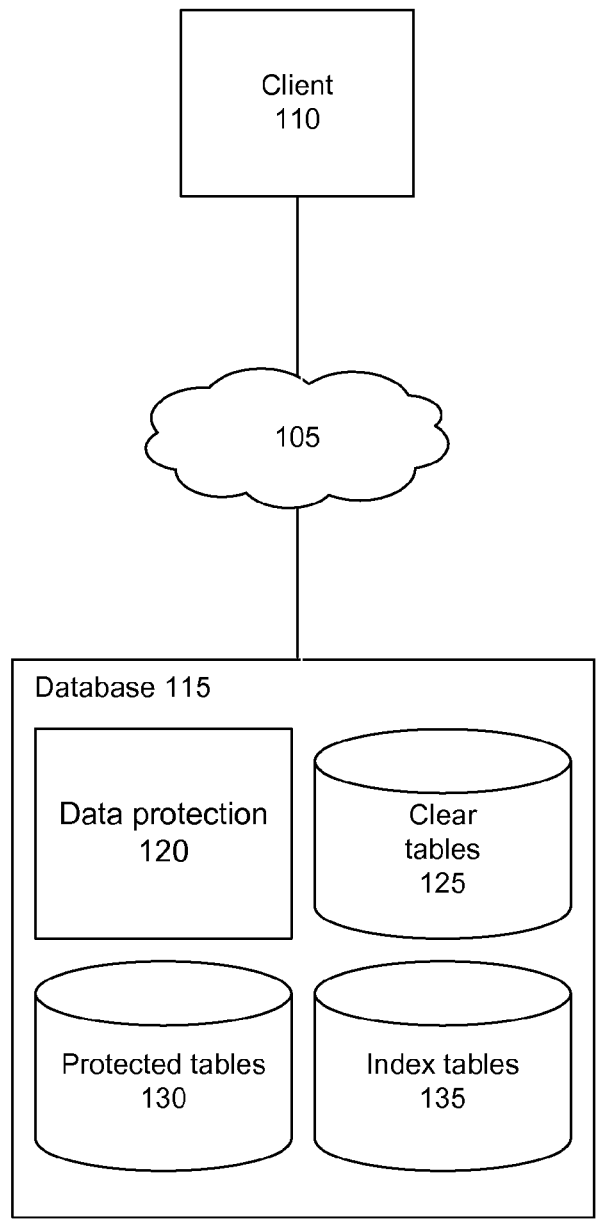
FIG. 1 illustrates a data shuffling environment configured to receive, shuffle, and store columnar data tables, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Columnar Table Overview

A column-oriented database management system (DBMS) stores data tables as columns of data rather than as rows of data, as row-oriented DBMSs do. This is advantageous for data warehouses, content relationship management (CRM) systems, library card catalogs, and other ad-hoc inquiry systems where aggregates are computed over large numbers of similar data items. In particular, "column oriented" refers to a focus on optimizations for column-oriented workloads, in contrast to row-oriented databases that focus on row-oriented workloads.

Database systems often store data in a series of rows and columns within storage databases. Each row can include of a series of references to a series of column specific cells. Data can instead be stored in columnar tables, which allows data to be stored much more efficiently than tables with each row storing only a single record. Columnar tables can also reduce the number of duplicate values among rows.

Columnar data can be protected using one or more types of encoding, such as encryption or tokenization. In order to encode or decode such data, a user has to possess a key and/or token table, which can prove cumbersome. An alternative is to use shuffling of columnar fields in a consistent manner to create inconsistencies among the rows of data. As a result, unauthorized users can only get results containing rows of shuffled data while authorized users have the means to reassemble the shuffled rows into the correct order. This is possible due to the way rows and columns are linked in a columnar table. Each row in a columnar table is a series of pointers or indices that refers to a column data array. When shuffling occurs, the original pointer value is moved to a different location, thus corresponding to a different location in the column data array, securing the overall data. An index mapping is created prior to the shuffling in order for the system to later be able to unsecure/unprotect the secured data by moving shuffled pointer values back to their original locations.

Columnar Table Data Protection Overview

FIG. 1 illustrates a data shuffling environment configured to receive, shuffle, and store columnar data tables, according to one embodiment. The environment 100 of FIG. 1 includes a client 110 and a database 115, communicatively coupled via a network 105. Although only one client and one database are illustrated in the embodiment of FIG. 1, other embodiments can include any number of clients and/or databases.

The client 110 can be associated with a retailer, business, or other organization, though it should be noted that clients can also be associated with individual users or any other suitable entity. A client can receive sensitive data, for instance a credit card number or other account number during the course of a transaction with a user, and can provide the sensitive data to the database 115, for instance as a field within a columnar table stored at the database, or as part of a columnar table transferred from the client to the database. The database can be associated with an entity corresponding to the client, such as a business, a bank, a web server, or the like.

The client 110 is a computing device capable of processing data as well as transmitting data to and receiving data from the database 115 via the network 105. For example, the client can include a desktop computer, laptop computer, smart phone, tablet computing device, server, payment terminal, or any other device having computing and data communication capabilities. Likewise, the database is a computing device configured to protect columnar table data according to the principles described herein. Each computing device (such as the client and the database) includes one or more processors, memory, storage, and networking components, and is specially configured to perform the columnar table data protection techniques described herein. The client is communicatively coupled to the network and can interact with the database using software such as a web browser or other application with communication functionality.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

The database 115 includes a data protection engine 120, a clear tables storage module 125, a protected tables storage module 130, and an index tables storage module 135. The database can receive data from the client 110, for instance a data table or data for insertion into one or more table fields. Received data is stored in the clear tables storage module. The data protection engine protects data in a data table stored in the clear tables storage module using one or more shuffle operations as described herein, producing a protected data table and an index table for storage in the protected tables storage module and the index tables storage module, respectively. In some embodiments, a data table stored in the clear tables storage module is deleted after the data protection engine protects the data table and produces a corresponding protected table and index table.

The data protection engine 120 can protect data in a data table received from the client 110 before it is stored in the clear tables storage module 125. In some embodiments, the data protection engine performs one or more encoding operations on all or part of the data in a data table prior to performing one or more shuffling operations as described herein. For instance, the data protection engine can encrypt data fields within a particular column in a data table, can shuffle the encrypted data fields within the column, and can tokenize the shuffled data fields within the column. Information describing any encoding operations performed by the data protection module can be stored, for instance in association with a corresponding protected table in the protected tables storage module 130, in association with a corresponding index table in the index table storage module 135, or in any other suitable module within the database 115, in the client, or in any suitable external entity not illustrated in the embodiment of FIG. 1.

The data protection engine 120 can protect data in a data table in response to receiving data from the client 110, in response to a request for data protection from the client, in response to a request for access to the data from the client, or in response to any other suitable interaction with the client. In some embodiments, the data protection engine performs updated data protection operations on data in a data table on a pre-determined interval of time, for instance, re-shuffling data in a data table column once every hour or every 24 hours. The data protection engine can access token tables for use in tokenizing data within a data table (either before or after shuffling data within a data table column), for instance from the client, from a token table storage module within the database 115 (not shown in FIG. 1), or from an external entity (not shown in FIG. 1). Likewise, the data protection engine can access an encryption key for use in encrypting data within a data table (either before or after shuffling data within a data table column), for instance from the client or other module or entity not shown in FIG. 1. In some embodiments, token tables and/or encryption keys are included in received requests for data access or data protection from the client. Tokenization is described in greater detail in pending U.S. application Ser. No. 14/042,314, titled "Table-Connected Tokenization", filed Sep. 30, 2013, the contents of which are incorporated by reference herein in their entirety.

Column Shuffling Operation

Figure 2:
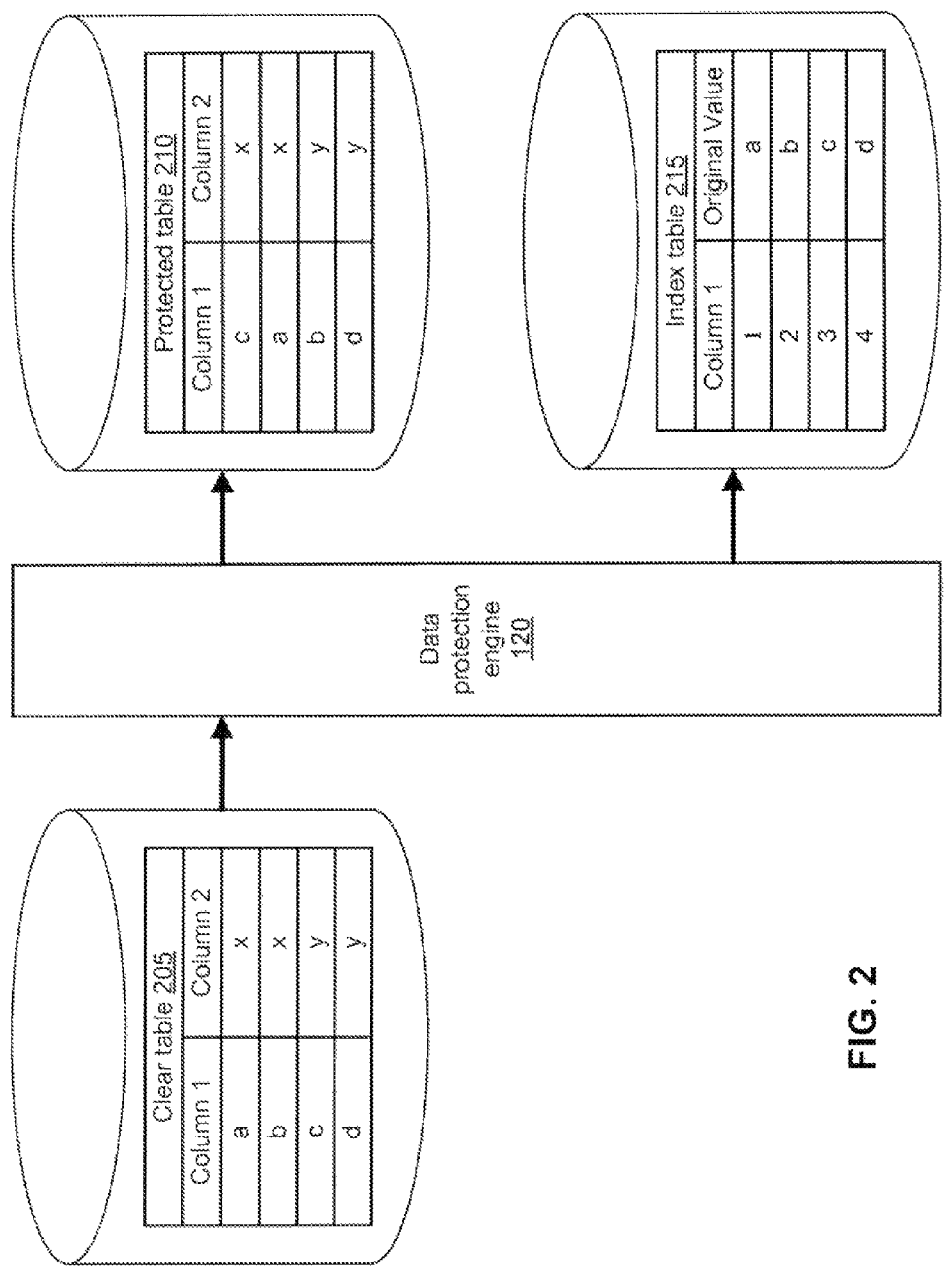
FIG. 2 illustrates the shuffling of columnar data tables, according to one embodiment.

FIG. 2 illustrates the shuffling of columnar data tables, according to one embodiment. A clear table 205, for instance a data table stored in the clear table storage module 125 of FIG. 1, is protected by the data protection engine 120, producing the protected table 210 (for instance, for storing in the protected table storage module 130) and the index table 215 (for instance, for storing in the index table storage module 135).

The data protection engine 120 accesses the clear table 205, which stores raw columnar data. In the embodiment shown in FIG. 2, the different tables 205, 210, 215 each only have four rows and two columns, though in other embodiments, the tables 205, 210, 215 may have any number of rows and columns. Upon receiving the data from the clear table 205, the data protection engine 120 generates two additional tables: a protected table 210 and an index table 215. In an embodiment, the data protection engine maps a list of index values (stored in column 1 of the index table) to the original pointer values in column 1 of the clear table to generate an index table. As a result, the "original value" column of the index table includes entries identical to column 1 of the clear table.

In addition to generating an index table 215, the data protection engine 120 also generates a protected table 210. In the protected table illustrated in FIG. 1, column 2 remains the same as column 2 in the clear table 205. However, column 1 of the protected table now contains pointer values that are shuffled when compared to column 1 in the clear table. The data protection engine can perform any of a number of different shuffling operations when shuffling a column of a clear table to produce a shuffled column of a protected table. Examples of such shuffling operations include (but are not limited to) random shuffle algorithms, grouped shuffle algorithms, sorting algorithms, value replacement algorithms, index value sorting algorithms, and the like. Various shuffling operations are discussed in greater detail with regards to FIGS. 3-5 below.

Figure 3:
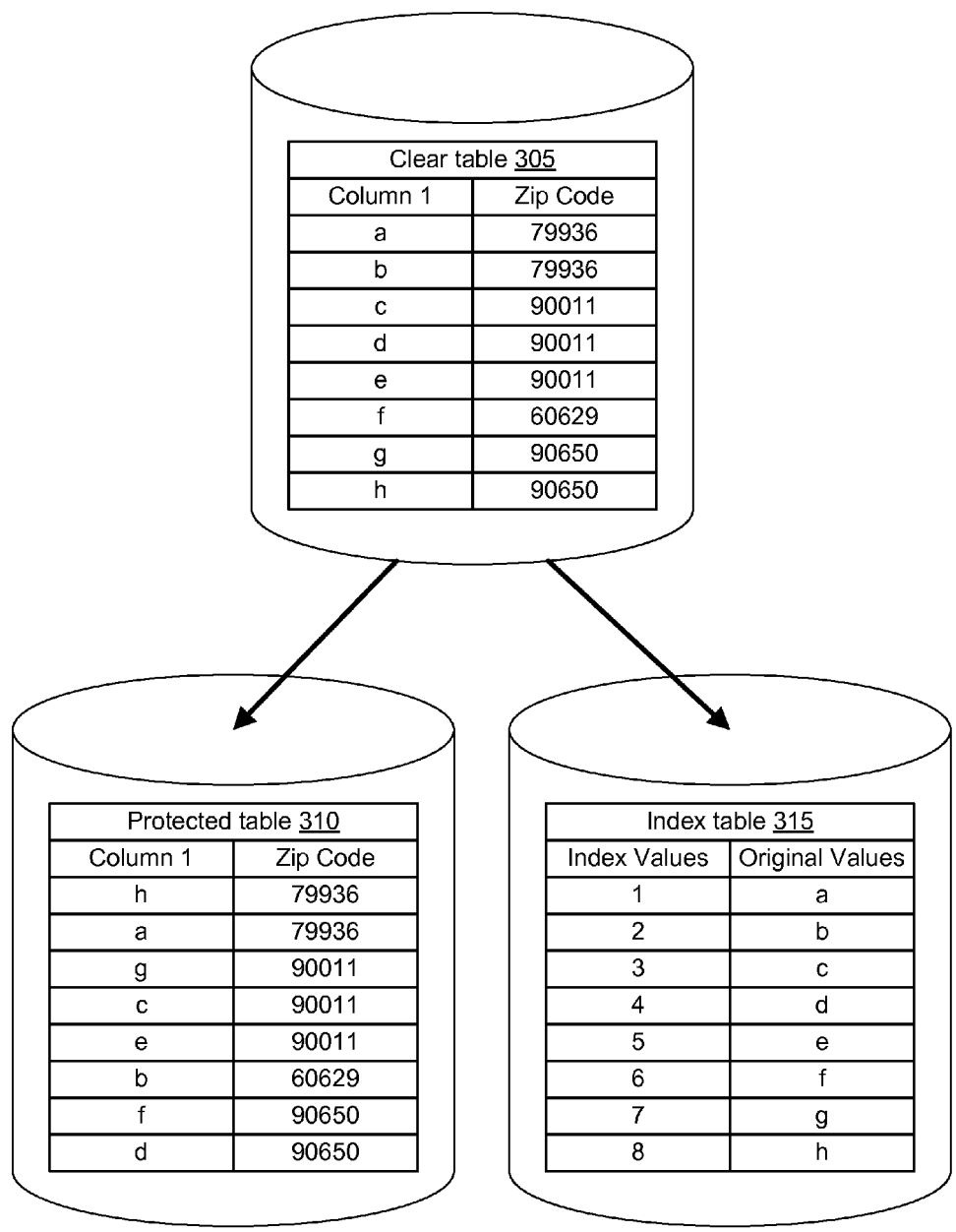
FIG. 3 illustrates a random shuffle operation for protecting columnar data, according to one embodiment.

FIG. 3 illustrates a random shuffle operation for protecting columnar data, according to one embodiment. In a random shuffle operation, pointers in a column are randomly reassigned to a row within the column such that each pointer within the column is assigned to a different row within the column than the row to which the pointer was originally assigned. In some embodiments, random shuffle operations assign each pointer in a column to a row associated with a different value in a second column than the value in the second column of the original row to which the pointer corresponds.

In the example shown in FIG. 3, clear table 305 includes two columns: column 1 and a "zip code" column. In generating the protected table 310, the zip code column is included within the protected table without alteration. Column 1, which contains alphabetical values, is randomly shuffled so that each alphabetical value corresponds to a randomly selected zip code in the protected table. For example, the "abcdefgh" order of the values in column 1 in the clear table is converted into a "hagcebfd" order in the protected table. In some cases, the random shuffling results in values in column 1 being reassigned a different zip code. Alternatively, in some instances one or more values may be reassigned to the same zip code, such as the values "e" and "90011" in FIG. 3, due to the random nature of the shuffling. As a result, a user viewing the protected table is unable to determine the original association between values in column 1 and in the zip code column in clear table 305.

To allow an entity to re-order the values in column 1 of the protected table 310 to match the original ordering of the clear table 305, an index table 315 is generated mapping a set of ordered index values to the pointer values in column 1 of the clear table. The index table may be used in combination with the protected table 310 to reassemble the clear table 305. For example, to determine which row each pointer value of the shuffled column 1 of the protected table belongs, the index table can be queried with the pointer value (for instance, the pointer value "g"), and the row identity can be received in response to the query (for instance, the pointer value "g" is mapped to the index value "7" in the index table, indicating that the pointer value "g" corresponds to the 7$^{th}$ row of the clear table). It should be noted that although the index values in the index table are numerically ordered in the embodiment of FIG. 3, in other embodiments, the index values can be ordered according to any suitable order.

One type of random shuffle operation is the Fisher-Yates shuffle or the Knuth shuffle. The Fisher-Yates shuffle is an algorithm that generates random permutations of a finite set. In another embodiment, a variant of the Fisher-Yates shuffle, known as the Sattolo's algorithm, may be used to generate random permutations of a defined length. When properly implemented, the Fisher-Yates shuffle has a nearly equal probability of generating every permutation and is thus substantially unbiased. A benefit of using the Fisher-Yates shuffle is that the algorithm is efficient. The time required to shuffle a set of items is proportional to the number of items being shuffled, and minimal additional storage space is required.

Figure 4:
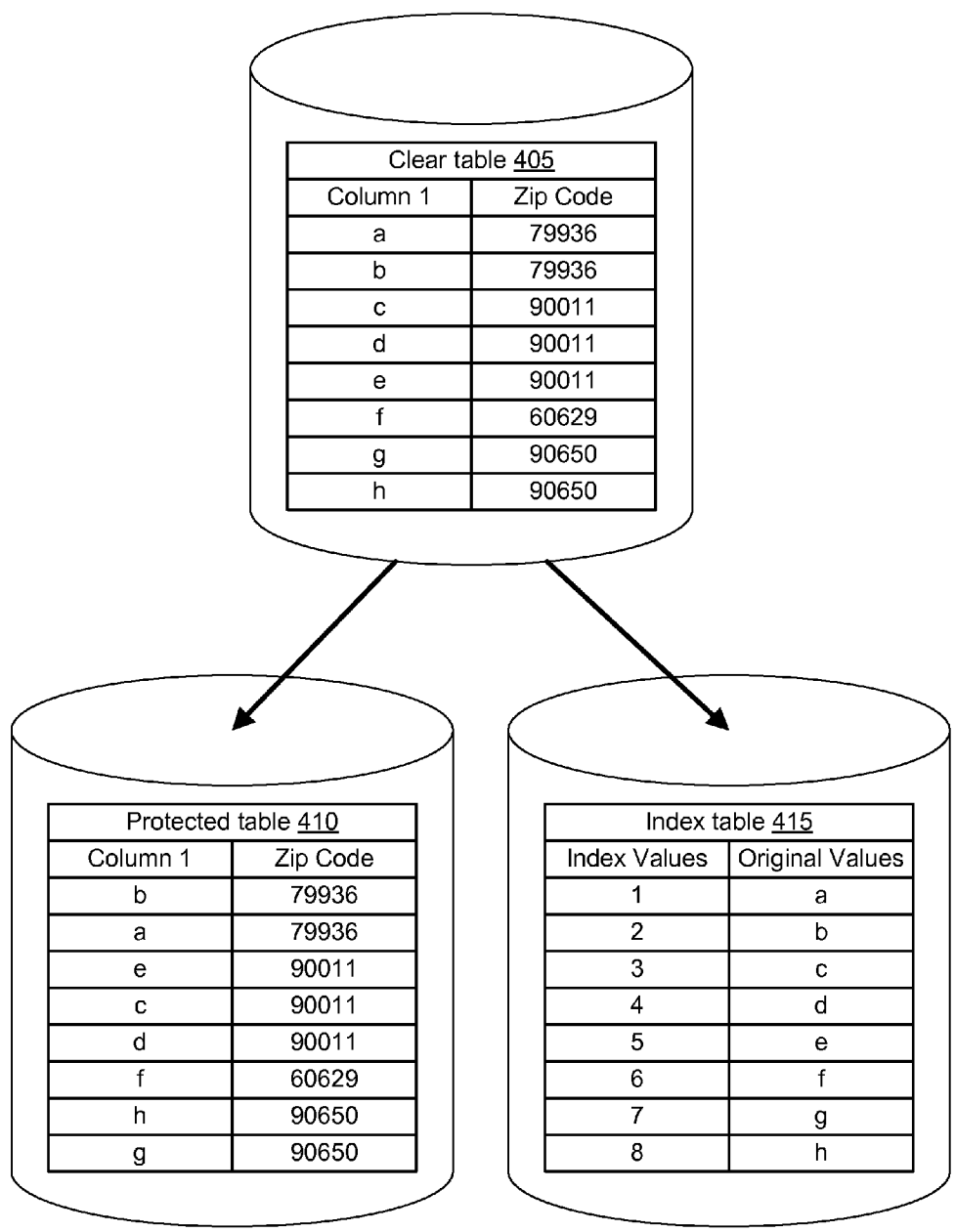
FIG. 4 illustrates a group shuffle operation for protecting columnar data, according to one embodiment.

FIG. 4 illustrates a group shuffle operation for protecting columnar data, according to one embodiment. In a group shuffle operation, an index table 415 is generated from clear table 405 in the same manner as described with regards to FIG. 3. However, the protected table 410 is generated differently than the protected table 310 of FIG. 3. In a group shuffle operation, each of the pointers in column 1 of the clear table is organized into subsets or groups defined by the values in other columns to which they correspond. In the example shown in FIG. 4, the pointers are grouped by corresponding zip codes. For example, pointers "a" and "b" are part of the same group because both pointers correspond to a first group (a group associated with the "79936" zip code), "c", "d" and "e" correspond to a second group (a group associated with the "90011" zip code), "f" corresponds to a third group (a group associated with the "60629" zip code), and "g" and "h" correspond to a fourth group (a group associated with the "90650" zip code). In a group shuffle operation, pointer values are shuffled within their own groups such that the pointer values may only exchange places with other pointer values in the same group. In the example embodiment of FIG. 4, "a" and "b" may only exchange places with each other since they are the only pointer values in first group, "c", "d" and "e" can only exchange places with each other as they are the only pointer values in the second group, "f" cannot exchange places with another pointer value being the only member of the third group, and "g" and "h" can exchange places only with each other as they are the only pointer values in the fourth group. Thus, in the embodiment of FIG. 4, the "abcdefgh" order of pointer values in column 1 of the clear table is converted into a "baecdfhg" order in the protected table after a group shuffle operation is performed.

Figure 5A:
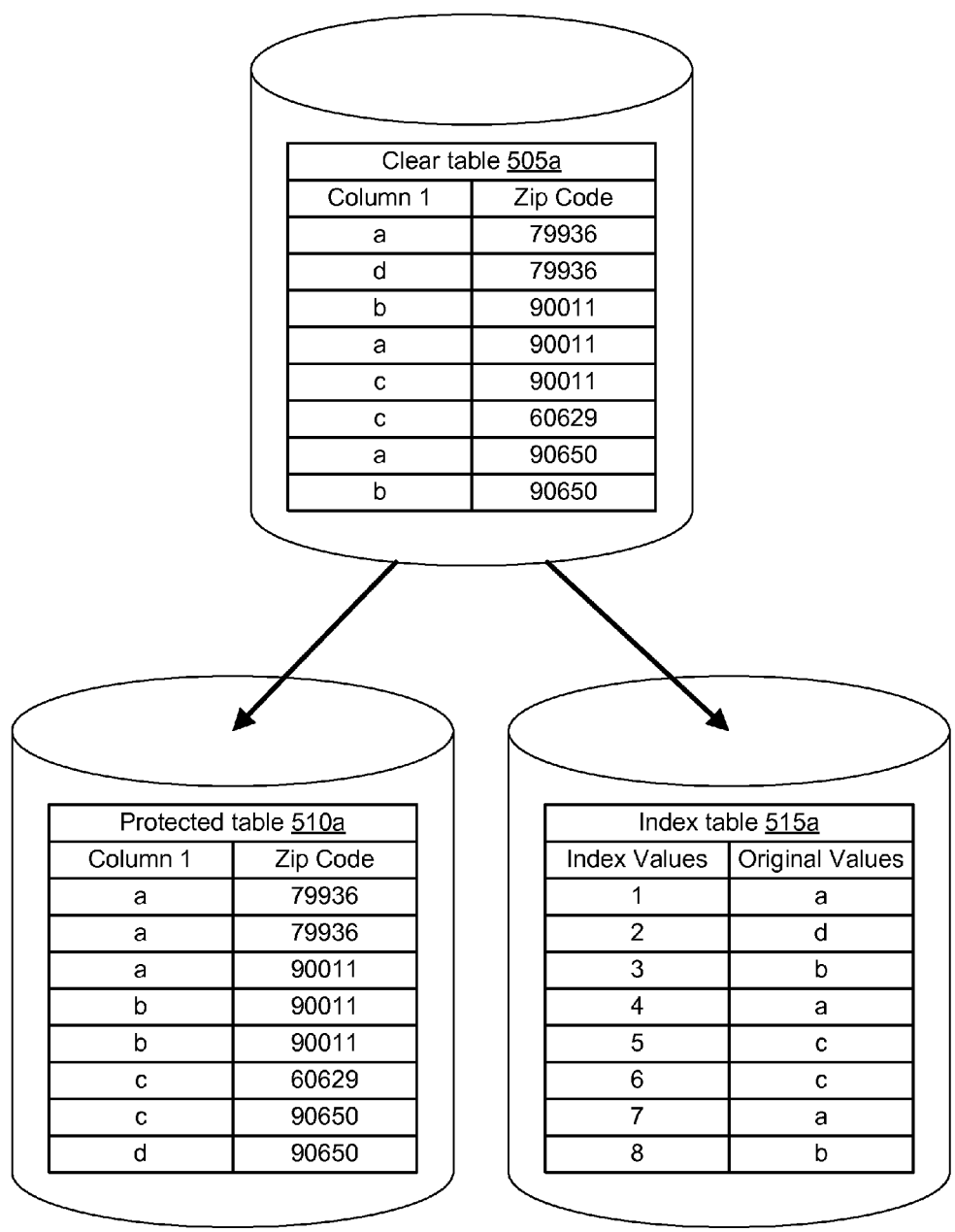
FIGS. 5a and 5b illustrate variations of a sorting shuffle operation for protecting columnar data, according to one embodiment.
Figure 5B:
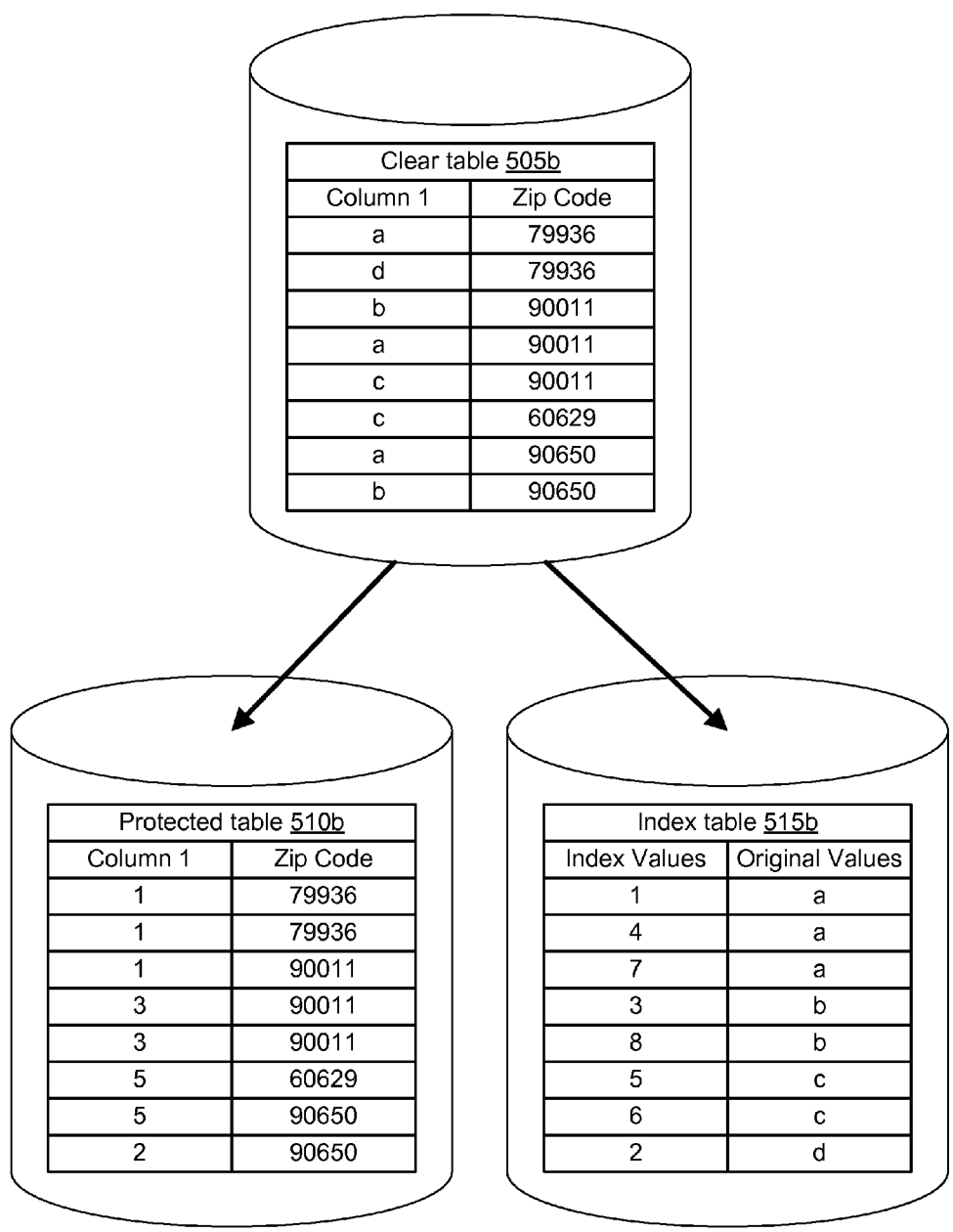

FIGS. 5a and 5b illustrate variations of a sorting shuffle operation for protecting columnar data, according to one embodiment. In the sorting operations illustrated in FIGS. 5a and 5b, pointers are sorted according to their values such that pointers of similar values are grouped next to each other within the protected tables 510a and 510b. Sorting prevents unauthorized users from reassembling a clear table through knowledge of the protected table and the reverse engineering of the algorithm used in a random shuffle.

In FIG. 5a, the sorting operation is limited to column 1 of the protected table 510a. The index table 515a is created from the clear table 505a as discussed above with regards to FIG. 3. However, in the embodiment of FIG. 5a, column 1 of the clear table is sorted by pointer value and stored as column 1 of the protected table. In various embodiments, column 1 of the protected table is organized by grouping similar pointer values together in a pre-determined ascending or descending order. For example, column 1 of the protected table is sorted such that the "a", "b", "c" and "d" values are sorted into an alphabetical "aaabbccd" ordering. In another embodiment, column 1 of the protected table may be sorted using different algorithms. For example, the values may be organized in reverse order (e.g., "dccbbaaa"), in groups ordered randomly (e.g., "aaaccdbb", "bbccaaad", "ccaaabbd" and so forth), or in other suitable sorting manners. By sorting pointer values and grouping similar pointer values next to each other, the generated protected table can be compressed into a smaller physical file size when stored into a storage database.

In a variation of the sorting operation illustrated in FIG. 5a, the sorted pointer values in column 1 of the protected table 510a may be replaced by one or more of the corresponding index values within the index table 515a. For example, in FIG. 5a, "a" can be replaced by either "1", "4" or "7" (the index values corresponding to "a" in the index table), "b" can be replaced "3" or "8" (the index values corresponding to "b" in the index table), "c" can be replaced by "5" or "6" (the index values corresponding to "c" in the index table), and "d" can be replaced by "2" (the only index value corresponding to "d" in the index table). Thus, column 1 of the protected table can include the ordered values "11133552" instead of the ordered values "aaabbccd". Other value orders may be used by selecting different corresponding index values, such as "44433662" or "11188552".

In FIG. 5b, a sorting operation is used to generate both column 1 of the protected table 510b as well as the "original values" column of the index table 515b. In the embodiment of FIG. 5b, the sorting operation described in FIG. 5a is combined with an index sorting algorithm, resulting in a multiple sorting operation. The protected table 510b is generated as described in FIG. 5a, though the pointer values in column 1 have been replaced with their corresponding mapped index value. The columns of the index table 515b has been sorted by ordering the values in the "original value" column alphabetically (e.g., all the "a" values are grouped together, all the "b" values are grouped together, and so forth). Furthermore, each index value corresponding to a value in the original value column is also sorted such that the index values still reference the same original value as prior to the sorting operation. In FIG. 5a, only the protected table 510a is sorted, while in FIG. 5b, both the protected table 510b and the index table 515b are sorted. Although the index table 515a in FIG. 5a has values ordered differently than that the index table 515b in FIG. 5b, the mapping between index values and original values is maintained between the index tables 515a and 515b. By sorting both the protected table 510b and the index table 515b, the data protection module 120 allows the protected table and the index table to be further compressed into a smaller physical file size when stored.

It should be emphasized that the tables displayed herein do not necessarily represent all data included within particular columns, but instead may only represent referenced data within a table definition. It should be also noted that although reference is made herein to the shuffling of column values or the re-ordering of table data, in some embodiments, the concepts described herein can be implemented without re-ordering column values. In such embodiments, the definitions of rows that reference particular column values can be changed. In one example, two columns are defined as:

Column A={11, 200, 301, 404, 501}
Column B={a, b, c}
A table can thus be defined as:

```
Table MYTABLE = {Column A, Column B}
MYTABLE Rows =
{
(#1, (Column A, 1), (Column B, 1)),
(#2, (Column A, 3), (Column B, 3))
}
```

In this example, selecting all rows of the table "MYTABLE" will result in the display of the following:

| 11 | a |
|---|---|
| 301 | c |

Continuing with this example, data protection can be implemented by altering the definition of the rows in the "MYTABLE" instance. For example:

```
MYTABLE Rows =
{
(#1, (Column A, 2), (Column B, 1)),
```

-continued

```
(#2, (Column A, 5), (Column B, 3))
}
```

Selecting all rows of the modified table will result in the display of the following:

| 200 | a |
|---|---|
| 501 | c |

In such an embodiment, by altering the definition of the rows in a table instance, the column data is not re-ordered, but the data presented within the table instance is re-ordered. Accordingly, the data protection principles described herein with regards to the re-ordering of column data apply equally to embodiments that implement data protection via the re-ordering of row data.

In an embodiment, data masking can be combined with the shuffling algorithms described herein. Data masking is a process of obscuring or masking specific elements in a data set. The use of data masking allows sensitive data to be replaced with realistic but fabricated data. Values are moved between rows in such a way that no values are presented in their original rows. A possible advantage to data masking is that the original data is not leaked when sensitive data is used in public testing and development processes. Data masking algorithms can be designed to be repeatable so that referential integrity, the data's interrelation with other data and systems, is maintained.

In some embodiments, various combinations of the previously mentioned shuffling operations may be used through one or more different devices to more securely protect a columnar data table. For example, a data table may be passed through a chain of devices, each device performing a shuffling operation with a received data table. The device may forward the generated protected table to another device for another shuffling operation while keeping the generated index table locally. As a result, index tables from all the involved devices are necessary in order to reassemble the original data table.

In other embodiments, the shuffling operations mentioned previously can also be combined with other methods of data protection, such as encryption and tokenization. Encryption and tokenization may occur in different combinations prior to or after the shuffling operations. In an embodiment, the original data tables may be processed through a combination of encryption and tokenization before the shuffling operations are performed. In some instances, the shuffled data tables may be subjected to a combination of encryption and tokenization to further secure the data. As a result of this chained method of combining encryption, tokenization and shuffling, data can be better protected from possible unauthorized access.

Figure 6:
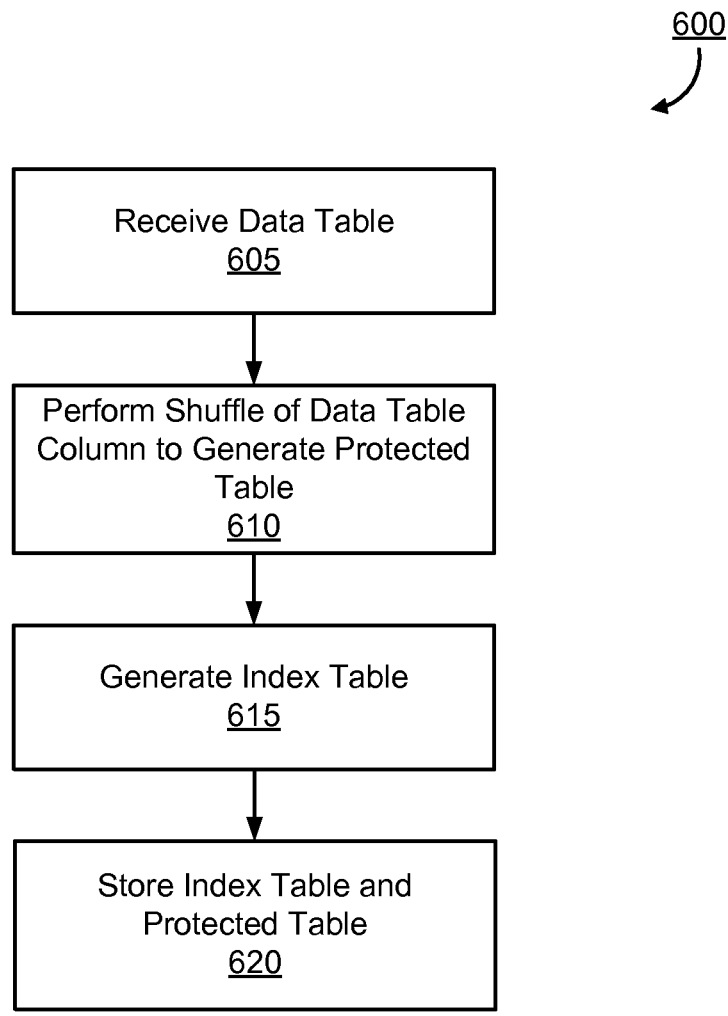
FIG. 6 is a flow diagram illustrating a data shuffling operation, according to one embodiment.

FIG. 6 is a flow diagram illustrating a data shuffling operation, according to one embodiment. A data table is received 605, and a shuffle operation is performed 610 on a data table column to generate a protected table. An index table is generated 615 based on the shuffle operation such that the index table maps values of the received data table to index values representative of a row to which each value of the received data table corresponds. The index table and the protected table are stored 620 for subsequent use.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be tokenized to include one or more use rules such that the resulting tokenized data fails a validation test and is verifiable. Thus, while self aware tokenization and verifiable tokenization are described separately, aspects of each may be performed in concert, and the resulting tokenized data can be both self aware tokenized data and verifiable tokenized data.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for protecting columnar data tables comprising:
   accessing a data table, the data table comprising at least a first column and a second column, each row of the data table including a pointer value associated with the first column and a corresponding data value associated with the second column;
   generating an index table mapping, for each row of the data table, a different index value in a set of index values to the pointer value associated with the first column included in the row;
   generating a protected table comprising a third column and a fourth column, the third column comprising the pointer values of the first column re-ordered by a shuffle operation such that at least one pointer value corresponds to a data value in the fourth column different than the data value of the second column to which the same pointer value in the first column corresponds, wherein performing the shuffle operation comprises 1) sorting the pointer values of the first column into one or more groups such that each group comprises one or more pointer values associated with the same corresponding data value of the second column, and 2) re-ordering the sorted pointer values within each group; and
   storing the protected table and the index table in one or more non-transitory storage mediums.

2. The computer-implemented method of claim 1, wherein the re-ordering of the sorted pointer values comprises a random re-ordering of the sorted pointer values.

3. The computer-implemented method of claim 1, wherein the shuffle operation further comprises ordering the pointer values of the first column based on the values of the pointer values.

4. The computer-implemented method of claim 3, further comprising substituting a pointer value of the third column with the index value mapped to the pointer value by the index table.

5. The computer implemented method of claim 3, further comprising sorting the pointer values in the generated index table, the sorting comprising ordering the pointer values based on the values of the pointer values.

6. The computer implemented method of claim 1, wherein the third column is hidden from view and wherein each pointer value comprises a row identifier.

7. A system for protecting columnar data tables comprising:
 a non-transitory computer-readable storage medium storing executable computing instructions for:
  accessing a data table, the data table comprising at least a first column and a second column, each row of the data table including a pointer value associated with the first column and a corresponding data value associated with the second column;
  generating an index table mapping, for each row of the data table, a different index value in a set of index values to the pointer value associated with the first column included in the row;
  generating a protected table comprising a third column and a fourth column, the third column comprising the pointer values of the first column re-ordered by a shuffle operation such that at least one pointer value corresponds to a data value in the fourth column different than the data value of the second column to which the same pointer value in the first column corresponds, wherein performing the shuffle operation comprises 1) sorting the pointer values of the first column into one or more groups such that each group comprises one or more pointer values associated with the same corresponding data values of the second column, and 2) re-ordering the sorted pointer values within each group; and
  storing the protected table and the index table in one or more non-transitory storage mediums; and
 a processor configured to execute the instructions.

8. The system of claim 7, wherein the re-ordering of the sorted pointer values comprises a random re-ordering of the sorted pointer values.

9. The system of claim 7, wherein the shuffle operation further comprises ordering the pointer values of the first column based on the values of the pointer values.

10. The system of claim 9, the instructions comprising further instructions for substituting a pointer value of the third column with the index value mapped to the pointer value by the index table.

11. The system of claim 9, the instructions comprising further instructions for sorting the pointer values in the generated index table, the sorting comprising ordering the pointer values based on the values of the pointer values.

12. The system of claim 7, wherein the third column is hidden from view and wherein each pointer value comprises a row identifier.

13. A non-transitory computer-readable storage medium storing executable computer instructions configured to, when executed, perform steps comprising:
 accessing a data table, the data table comprising at least a first column and a second column, each row of the data table including a pointer value associated with the first column and a corresponding data value associated with the second column;
 generating an index table mapping, for each row of the data table, a different index value in a set of index values to the pointer value associated with the first column included in the row;
 generating a protected table comprising a third column and a fourth column, the third column comprising the pointer values of the first column re-ordered by a shuffle operation such that at least one pointer value corresponds to a data value in the fourth column different than the data value of the second column to which the same pointer value in the first column corresponds, wherein performing the shuffle operation comprises 1) sorting the pointer values of the first column into one or more groups such that each group comprises one or more pointer values associated with the same corresponding data value of the second column, and 2) re-ordering the sorted pointer values within each group; and
 storing the protected table and the index table in one or more non-transitory storage mediums.

14. The computer-readable storage medium of claim 13, wherein the re-ordering of the sorted pointer values comprises a random re-ordering of the sorted pointer values.

15. The computer-readable storage medium of claim 13, wherein the shuffle operation further comprises ordering the pointer values of the first column based on the values of the pointer values.

16. The computer-readable storage medium of claim 15, the instructions configured to perform further steps comprising substituting a pointer value of the third column with the index value mapped to the pointer value by the index table.

17. The computer-readable storage medium of claim 15, the instructions configured to perform further steps comprising sorting the pointer values in the generated index table, the sorting comprising ordering the pointer values based on the values of the pointer values.

* * * * *